US011042903B1

(12) United States Patent
Crystal et al.

(10) Patent No.: US 11,042,903 B1
(45) Date of Patent: Jun. 22, 2021

(54) METHODS AND SYSTEMS FOR DETERMINING EXPOSURE TO OUTDOOR DISPLAYS

(71) Applicant: Oath (Americas) Inc., New York, NY (US)

(72) Inventors: Jay Crystal, Arlington, VA (US); Smitha Surapaneni, McLean, VA (US)

(73) Assignee: Verizon Media Inc., New York, NY (US)

( * ) Notice: Subject to any disclaimer, the term of this patent is extended or adjusted under 35 U.S.C. 154(b) by 110 days.

(21) Appl. No.: 15/695,849

(22) Filed: Sep. 5, 2017

(51) Int. Cl.
G06Q 30/00 (2012.01)
G06Q 30/02 (2012.01)

(52) U.S. Cl.
CPC ..... *G06Q 30/0266* (2013.01); *G06Q 30/0254* (2013.01); *G06Q 30/0259* (2013.01); *G06Q 30/0261* (2013.01); *G06Q 30/0267* (2013.01)

(58) Field of Classification Search
None
See application file for complete search history.

(56) References Cited

U.S. PATENT DOCUMENTS

2002/0084891 A1* 7/2002 Mankins ............. B60Q 1/2611
340/425.5
2008/0248815 A1* 10/2008 Busch ................... H04W 4/029
455/456.5
2020/0258018 A1* 8/2020 Brady .................... G06Q 10/08

OTHER PUBLICATIONS

Edwards, Alain D., Implementation of a VANET Geo-Fence Based Adaptive Traffic Light Control Scheme, Florida Atlantic University—Boca Raton, Florida, Aug. 2015—Master of Science Thesis (Year: 2015).*

* cited by examiner

*Primary Examiner* — Michael W Schmucker
(74) *Attorney, Agent, or Firm* — Bookoff McAndrews, PLLC (57) ABSTRACT

Systems and methods are disclosed for executing the electronic distribution of electronic content to a display associated with a transit-oriented vehicle. The method includes receiving, from an advertiser or content provider, a request to transmit electronic content to the display, identifying a geographical zone associated with the transit-oriented vehicle; quantifying the relative position of any one of the plurality of electronic devices to the geographical zone as the transit-oriented vehicle moves along a predetermined path; identifying a displacement pattern generated by the plurality of directional vectors for the plurality of electronic devices as the geographical zone moves along the predetermined path; tailoring the electronic content based on the displacement pattern generated by the plurality of directional vectors; and transmitting the tailored electronic content to the display.

20 Claims, 9 Drawing Sheets

METHODS AND SYSTEMS FOR DETERMINING EXPOSURE TO OUTDOOR DISPLAYS

TECHNICAL FIELD

Various embodiments of the present disclosure relate generally to the electronic distribution of electronic content to displays. More specifically, exemplary embodiments of the present disclosure relate to systems and methods for tailoring electronic content distributed to displays based on modeling predictive analytics for electronic devices traveling relative to geographic zones.

BACKGROUND

Digital out-of-home (DOOH) inventory generally refers to ads, content, and video showcased to potential consumers outside the home. The message delivery to potential consumers is generally supported by rich and dynamic digital technology (e.g., dynamic displays), maximized with real-time capabilities to target consumers on-the-go. Displays, including dynamic displays, associated with DOOH inventory may encompass a variety of screen shapes, sizes, and level of interactivity. From digital billboards and signs atop taxis, to place-based digital messaging at airport gates, gyms, and waiting rooms, DOOH inventory has the potential to bridge between context and location.

While delivery of the electronic content to targeted dynamic displays may be simple for the advertiser, the effectiveness of exposure to potential consumers has been more difficult to measure. A common solution, for example, has been to use survey-based methodologies to determine whether the electronic content had been seen. But this solution tends to be a more coarse approach that may not account for regular travel patterns of potential consumers on-the-go.

Accordingly, a need exists for methods and systems for determining travel patterns of potential consumers to provide electronic content providers with finer granularity in data to improve exposure effectiveness of electronic content delivered to displays.

SUMMARY

According to certain embodiments, systems and methods are disclosed for executing the electronic distribution of electronic content to a display. One method may include, receiving, from an advertiser or content provider, a request to transmit electronic content to the display, wherein the display is associated with a transit-oriented vehicle, wherein the electronic content is directed to a desired subset of individuals associated with a plurality of electronic devices, and wherein the electronic content relates to a target location affiliated with the advertiser or content provider; identifying a geographical zone associated with the transit-oriented vehicle; generating a plurality of directional vectors for quantifying the relative position of any one of the plurality of electronic devices to the geographical zone as the transit-oriented vehicle moves along a predetermined path, wherein generating a directional vector comprises the steps: generating a motion vector of the transit-oriented vehicle as it moves along the predetermined path, wherein the motion vector tracks the movement of the geographical zone as it moves along the predetermined path; receiving presence information relating to the presence of a first one of the plurality of electronic devices relative to the geographical zone, storing, in a database associated with the display, the presence information relating to the presence of the first one of the plurality of electronic devices relative to the geographical zone, (d) receiving absence information relating to the absence of the first one of the plurality of electronic devices relative to the geographical zone, (e) storing, in the database associated with the display, the absence information relating to the absence of the first one of the plurality of electronic devices relative to the geographical zone, (f) generating a directional vector of the one of the plurality of electronic devices based on the presence information, the absence information, and the predetermined path of the transit-oriented vehicle, (g) storing, in the database associated with the display, the directional vector of the one of the plurality of electronic devices, and (h) repeating steps (a) through (g) to generate a directional vector for a different one of the plurality of the electronic devices of the desired subset of individuals; storing, in a database associated with the display, the plurality of directional vectors generated for the plurality of electronic devices as the geographical zone moves along the predetermined path; identifying a displacement pattern generated by the plurality of directional vectors for the plurality of electronic devices as the geographical zone moves along the predetermined path; tailoring the electronic content based on the displacement pattern generated by the plurality of directional vectors; and transmitting the tailored electronic content to the display.

According to certain embodiments, systems are disclosed for managing the electronic distribution of electronic content to a display. One system includes a data storage device storing instructions for managing the electronic distribution of electronic content to the display, wherein the display is associated with a transit-oriented vehicle; and a processor configured to execute the instructions to perform a method. The method may include receiving, from an advertiser or content provider, a request to transmit electronic content to the display, wherein the display is associated with a transit-oriented vehicle, wherein the electronic content is directed to a desired subset of individuals associated with a plurality of electronic devices, and wherein the electronic content relates to a target location affiliated with the advertiser or content provider; identifying a geographical zone associated with the transit-oriented vehicle; generating a plurality of directional vectors for quantifying the relative position of any one of the plurality of electronic devices to the geographical zone as the transit-oriented vehicle moves along a predetermined path, wherein generating a directional vector comprises the steps: generating a motion vector of the transit-oriented vehicle as it moves along the predetermined path, wherein the motion vector tracks the movement of the geographical zone as it moves along the predetermined path; receiving presence information relating to the presence of a first one of the plurality of electronic devices relative to the geographical zone, storing, in a database associated with the display, the presence information relating to the presence of the first one of the plurality of electronic devices relative to the geographical zone, (d) receiving absence information relating to the absence of the first one of the plurality of electronic devices relative to the geographical zone, (e) storing, in the database associated with the display, the absence information relating to the absence of the first one of the plurality of electronic devices relative to the geographical zone, (f) generating a directional vector of the one of the plurality of electronic devices based on the presence information, the absence information, and the predetermined path of the transit-oriented vehicle, (g) storing, in the database associated with the display, the directional vector of the one of the plurality of electronic devices, and (h) repeating steps (a) through (g) to generate a directional vector for a different one of the plurality of the electronic devices of the desired subset of individuals; storing, in a database associated with the display, the plurality of directional vectors generated for the plurality of electronic devices as the geographical zone moves along the predetermined path; identifying a displacement pattern generated by the plurality of directional vectors for the plurality of electronic devices as the geographical zone moves along the predetermined path; tailoring the electronic content based on the displacement pattern generated by the plurality of directional vectors; and transmitting the tailored electronic content to the display.

According to certain embodiments, a computer-readable medium is disclosed that, when executed by a computer system, causes the computer system to perform a method for managing the electronic distribution of electronic content to a display, the method including: receiving, from an advertiser or content provider, a request to transmit electronic content to the display, wherein the display is associated with a transit-oriented vehicle, wherein the electronic content is directed to a desired subset of individuals associated with a plurality of electronic devices, and wherein the electronic content relates to a target location affiliated with the advertiser or content provider; identifying a geographical zone associated with the transit-oriented vehicle; generating a plurality of directional vectors for quantifying the relative position of any one of the plurality of electronic devices to the geographical zone as the transit-oriented vehicle moves along a predetermined path, wherein generating a directional vector comprises the steps: generating a motion vector of the transit-oriented vehicle as it moves along the predetermined path, wherein the motion vector tracks the movement of the geographical zone as it moves along the predetermined path; receiving presence information relating to the presence of a first one of the plurality of electronic devices relative to the geographical zone, storing, in a database associated with the display, the presence information relating to the presence of the first one of the plurality of electronic devices relative to the geographical zone, (d) receiving absence information relating to the absence of the first one of the plurality of electronic devices relative to the geographical zone, (e) storing, in the database associated with the display, the absence information relating to the absence of the first one of the plurality of electronic devices relative to the geographical zone, (f) generating a directional vector of the one of the plurality of electronic devices based on the presence information, the absence information, and the predetermined path of the transit-oriented vehicle, (g) storing, in the database associated with the display, the directional vector of the one of the plurality of electronic devices, and (h) repeating steps (a) through (g) to generate a directional vector for a different one of the plurality of the electronic devices of the desired subset of individuals; storing, in a database associated with the display, the plurality of directional vectors generated for the plurality of electronic devices as the geographical zone moves along the predetermined path; identifying a displacement pattern generated by the plurality of directional vectors for the plurality of electronic devices as the geographical zone moves along the predetermined path; tailoring the electronic content based on the displacement pattern generated by the plurality of directional vectors; and transmitting the tailored electronic content to the display.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

The present disclosure describes methods and systems for detecting the presence and/or the movement of an electronic device associated with a user (e.g., potential consumer on-the-go), and presenting the user with DOOH inventory (e.g., electronic content) at displays, including dynamic displays, based on travel patterns of the user. Electronic content providers, such as advertisers and content publishers, generally deliver DOOH inventory to displays in a variety of formats, including stand-alone screens, kiosks, jumbotrons, interactive media, and other formats found in public places or on transit-oriented vehicles. Specifically, the present disclosure describes methods and systems for presenting electronic content to a user based on, e.g., the movement of a user relative to predefined geographic zones, such as geofences, associated with either a fixed location (e.g., fixed-location billboard) or a mobile location (e.g., transit-oriented vehicle, such as, e.g., bus, subway, train, taxi, etc.). In some embodiments, the placement of the DOOH inventory may be optimized based on travel patterns of the user. In other embodiments, the content of the DOOH inventory may be tailored based on the movement of transit-oriented vehicles and user exposure patterns. Therefore, methods and systems are disclosed for presenting DOOH inventory (e.g., electronic content) to a user based on the user's exposure relative to the movement of a transit-oriented vehicle, or based on the user's movement (e.g., detected via the user's device location) relative to a fixed location, such as, e.g., a retail location (e.g., a "brick and mortar"), a road location (e.g., a highway exit or road intersection), a public venue (e.g. a stadium or theater), a commercial building, or any another point of interest.

The use of electronic maps has become widespread through the use of in-vehicle or portable global positioning system ("GPS") devices, mobile devices, and other electronic devices. These electronic maps often convey information about roads, traffic, buildings, landmarks, terrain, etc., related to geographical regions of interest. Some electronic maps may be interactive, allowing users, for example, to view their current location on a map of a particular area and the surrounding areas. Many providers of electronic mapping services allow users to input origin and destination locations and provide various routing directions to and from those locations. The routing directions may be generated based on one or more of travel time, travel distance, traffic, construction, route preference (e.g., tolls, highways, etc.), and time-of-day. Electronic map providers may determine and update routing information based on a user's location using GPS or other location detecting means transmitted via a signal emitted by a user's electronic device. Based on this location information, the electronic maps may provide users with real-time information, such as live traffic information and dynamic routing adjustments.

Electronic content providers, such as advertisers and content publishers, have been using such electronic maps to send electronic content to users. Some content providers, for example, may target users within a predetermined geographic zone so that users within the zone receive the targeted content. The predetermined geographic zones, commonly referred to as geo-fences or geofences, are digital, virtual boundaries having a predetermined size. The geofences may be created by leveraging GPS data and various forms of wireless technology, including the use of beacons, WIFI, Bluetooth, and so on. Electronic content providers, such as national advertisers, often approach geographic targeting by constructing geofences around various locations. For example, some content providers detect the presence of an electronic device user within a certain radius of a target location, or encourage users to inform the content provider of their presence by "checking-in." However, these radius or other geographic-based methods of providing electronic content may be arbitrary and may not account for variations (e.g., the presence of the advertised goods, services, point-of-interest ("POI"), or target location) within different geographic regions, or they may not account for travel patterns of potential consumers on-the-go.

As a result, according to certain embodiments, systems and methods are described for creating geofences that assist in quantifying and relaying the movement of electronic devices (associated with consumers on-the-go) traveling between defined points-of-interest. In other embodiments, systems and methods are described for creating geofences that assist in quantifying and relaying the position of electronic devices (associated with consumers on-the-go) relative to the movement of transit-oriented vehicles. Electronic content then may be tailored by content providers according to identifiable travel patterns generated by the movement of potential consumers traveling between respective geofences, and/or according to identifiable travel patterns generated by the movement of geofences associated with transit-oriented vehicles.

Displays Associated with Fixed Locations

Figure 1A:
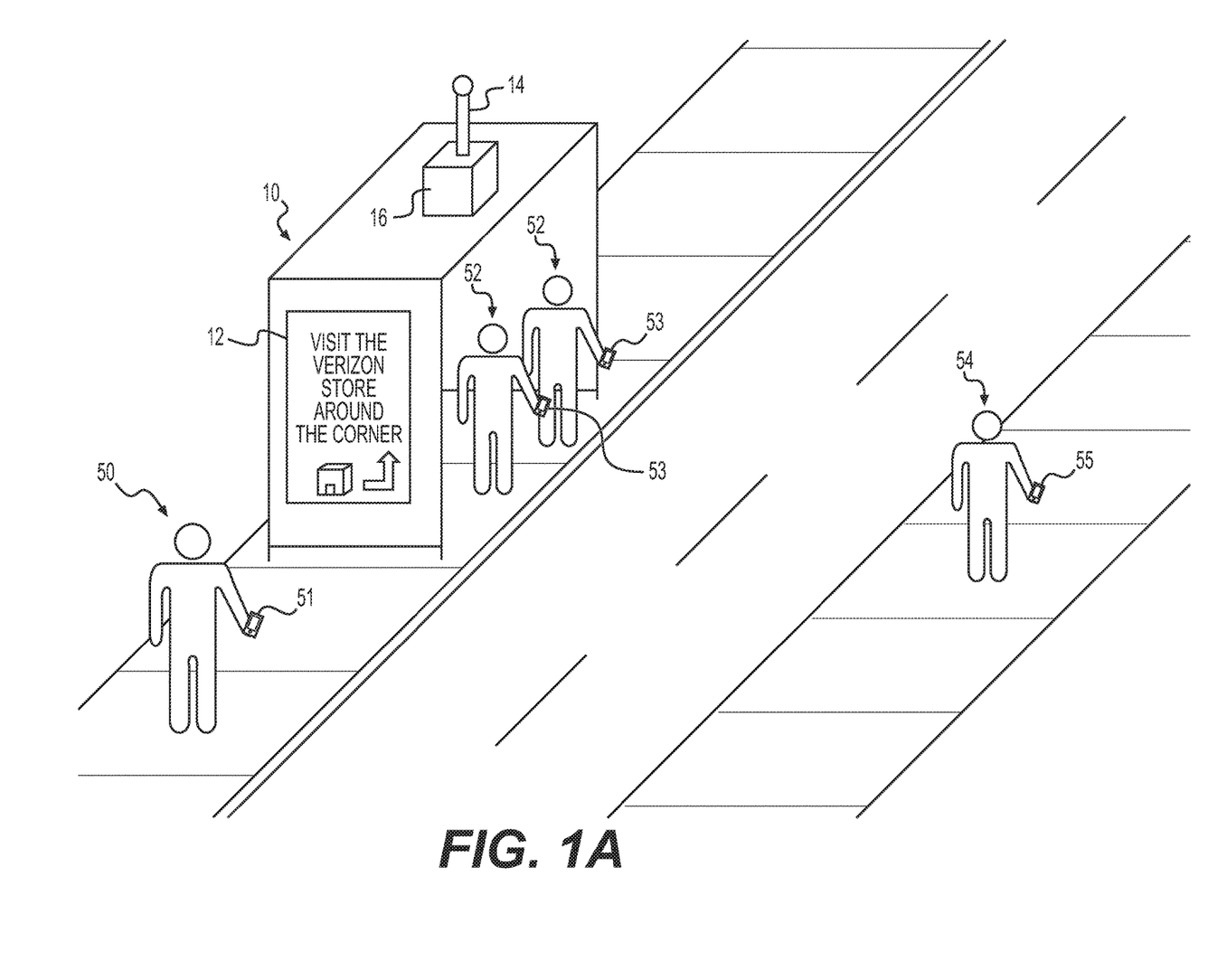
FIG. 1A is an illustration of scenario in which a subset of individuals associated with electronic devices are traveling relative to a display, according to an exemplary embodiment of the present disclosure.

FIG. 1A is an illustration of a scenario, according to an embodiment of the present disclosure, in which a content provider transmits electronic content to a digital display 12 targeting potential consumers on-the-go. Display 12 may be associated with a fixed location 16 that defines a geographical zone or geofence to monitor the movement of nearby electronic devices. Fixed location 16 may be connected to antenna 14 to enable wireless communication to display 12 and/or to communication networks associated with the content providers. In this example, display 12 may be located at a bus stop 10 where potential consumers may regularly frequent for traveling. Display 12 may be positioned inside and/or outside bus stop 10 to maximize exposure to potential consumers nearby. The content providers then may tailor the electronic content transmitted to display 12 based on the likelihood that potential consumers traveling nearby will view the transmitted electronic content. For example, user 52 may be a potential consumer with an electronic device 53 and may be more likely in view of display 12 because they are closest to display 12. User 50 may be a potential consumer with an electronic device 51 and may also be within view of display 12 because they are approaching display 12. User 54, however, may be a potential consumer with an electronic device 55 and may likely be out of view because they are too remote from display 12.

Figure 1B:
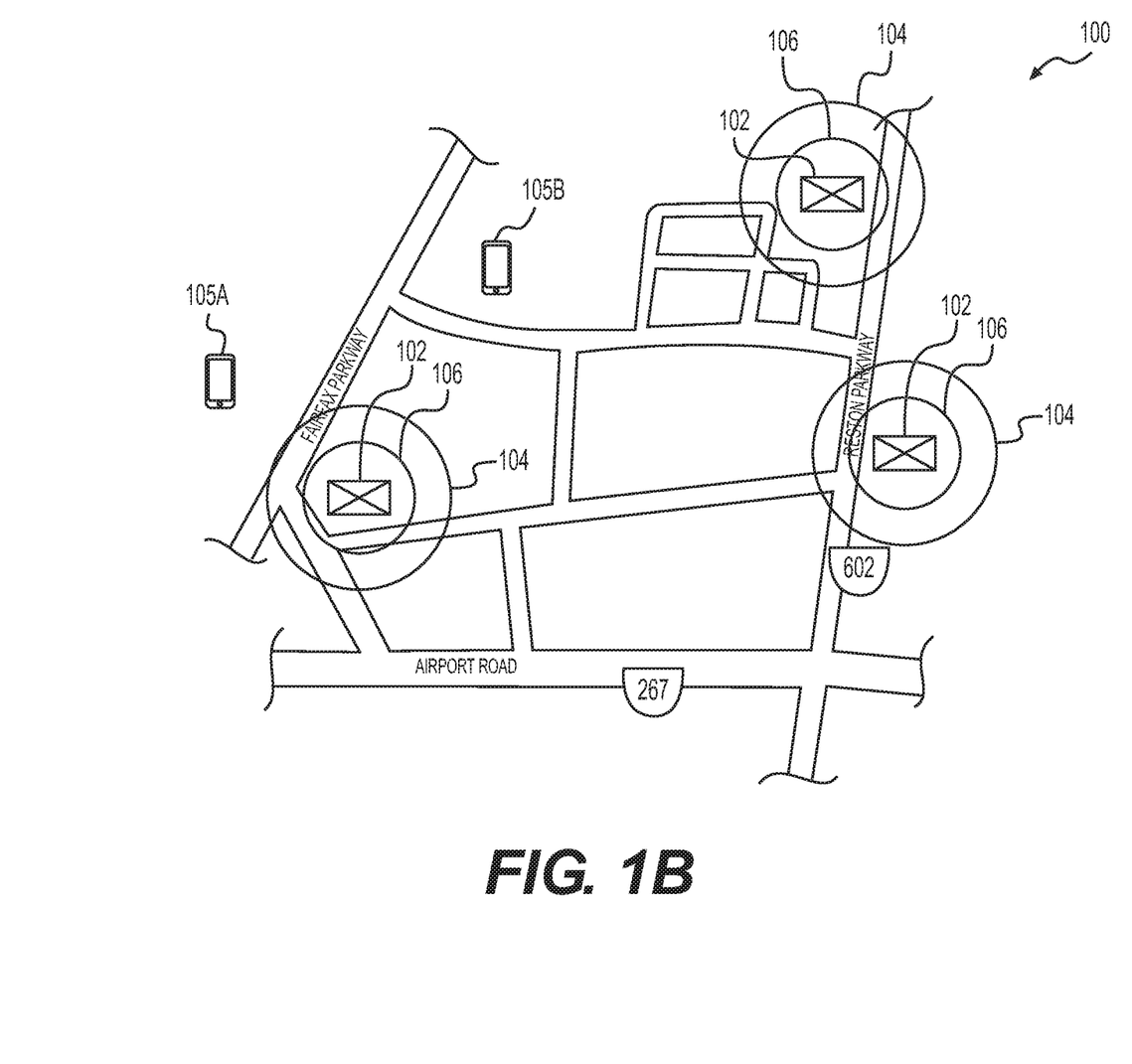
FIG. 1B is an illustration of an electronic map overlaid by a plurality of geofences or geographic zones, according to an exemplary embodiment of the present disclosure.

FIG. 1B is an illustration of an electronic map 100 including a plurality of geofences, according to an embodiment of the present disclosure. As used herein, the term "geo-fence" or "geofence" may include a virtual geographic zone having one or more perimeters and an area within the perimeter(s). The geofence(s) may or may not be visible to a user viewing an electronic map, but for illustrative purposes, FIG. 1B depicts a number of geofences 104, 106 superimposed over electronic map 100. Fixed location 102 (similar to fixed location 16 described above in relation to FIG. 1A) generates one or both of geofences 104, 106, and may be defined by any type or combination of GPS coordinates, address, road intersection, building, business, POI, venue, public space, or any other location of interest. Geofences 104, 106 may have any predefined radius and may be positioned at, or at any suitable distance from, display 12. In one embodiment, geofences 104 and 106 may be centered around display 12. For example, geofences 104 and 106 may quantify and relay the position of electronic devices 105A, 105B that are near and approaching display 12 (as similarly described above in relation to the bus stop example in FIG. 1A). In another embodiment, geofences 104 and 106 may be centered at an intersection selected near display 12 to monitor the movement of electronic devices 105A, 105b in passing vehicles.

Figure 1C:
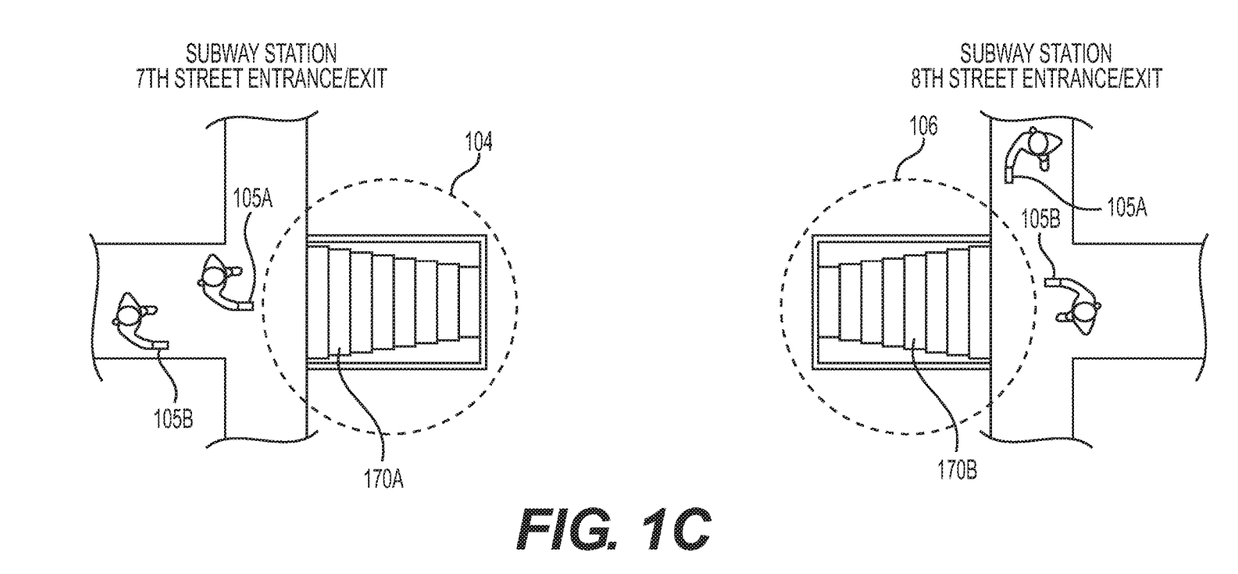
FIG. 1C is an illustration of entrance/exit ways to transit stations overlaid by a plurality of geofences or geographic zones, according to an exemplary embodiment of the present disclosure.
Figure 1D:
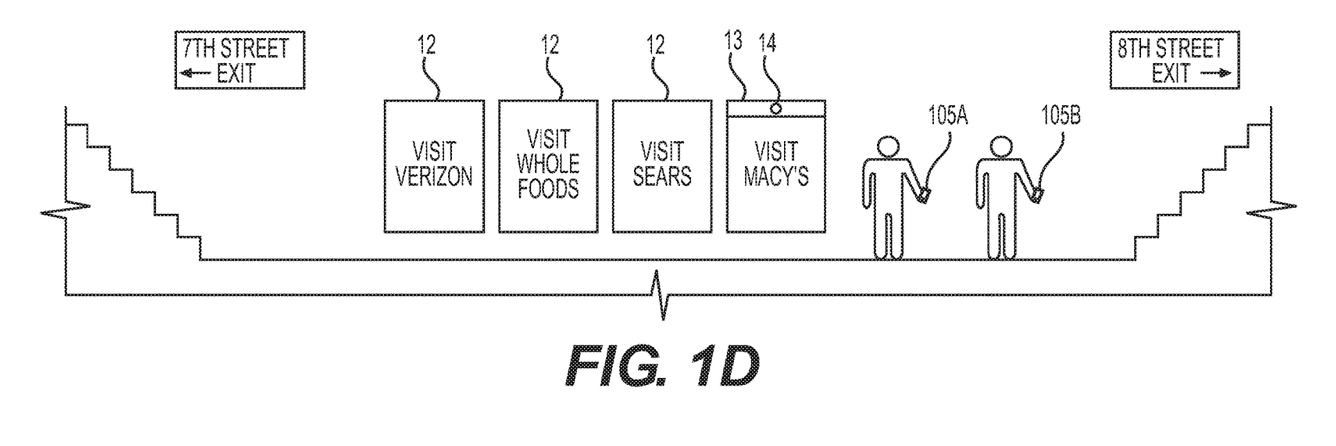
FIG. 1D is an illustration of a transit station with a plurality of displays, according to an exemplary embodiment of the present disclosure.

In yet another embodiment, geofences 104 and 106 may be located at remote locations from each other but within some predetermined distance from display 12. For example, geofences 104, 106 may be positioned at entrance/exit ways to an underground subway station where signal detection of electronic devices may be limited. FIG. 1C illustrates how each of geofences 104 and 106 may be located at separate and distinct transit entrance/exit ways to track the movement of electronic devices 105A, 105b. Geofence 104 may be located at entrance/exit way 170A, and geofence 106 may be located at entrance/exit way 170b. The movement of potential consumers traveling underground by subway then can be quantified and relayed as they enter and exit the respective subway stations. In some embodiments, the displays may be placed at each of the respective entrance/exit ways 170A, 170b. In other embodiments, the displays may be placed below ground level in the respective subway station where signal detection of electronic devices may be limited. FIG. 1D illustrates, for example, the placement of displays 12 below level at an underground subway station. Content providers then may tailor electronic content based on the tracked electronic devices 105A, 105B prior to transmitting to displays 12. While a subway station is depicted, it is to be appreciated that the respective geofences 104,106 may be similarly placed at other similarly situated transit points, such as, e.g., bus stations, airports, train stations, ferry docks, etc., to quantify and relay the movement of electronic devices 105A, 105B as passengers travel between ports and stations.

In other embodiments, proximity-based measurements may be made to identify users in locations where signal detection may be limited. FIG. 1D depicts an underground station where users may be with electronic devices 105A, 105B that may be difficult to detect while underground. Proximity-based devices instead may be used to detect and identify users in locations where their electronic devices 105A, 105B may otherwise be difficult to detect. Proximity device 14, for example, may detect and identify users in such restricted areas. In some embodiments, proximity device 14 may detect the presence and/or approach of users to dynamic display 13. In other embodiments, proximity device 14 may detect the identity of the user by using any suitable identity-detection method, such as, e.g., beacons, camera with field of view facial recognition, audio pixilation, speech recognition, etc. Beacons, for example, are location proximity nodes that can notify mobile device users of their presence within a given location. Beacons may be based on wireless technology, such as, e.g., LTE Direct, which may provide for device-to-device communications over cellular connections. A street vendor may, for example, leverage LTE Direct beacon technology to broadcast deals and promotions to nearby customers from their own mobile device. Other forms of wireless technologies enabling device-to-device communication (e.g., between Internet-of-things (IOT) devices), may include, for example, Bluetooth, Light-Fidelity (Li-Fi), Near-field communication (NFC), Radio-frequency identification (RFID), Wi-Fi, etc.

In some embodiments, content providers may tailor electronic content to transmit to dynamic display 13 based on the identified user and/or identified spectrum of users. In other embodiments, the dynamic display itself may leverage beacon technology to directly request the tailored electronic content based on the identified spectrum of users. And because the identified spectrum of users may change over a period of time, the electronic content requested by the display may be retargeted according to the changing exposure.

Displays Associated with Transit-Oriented Vehicles

Figure 1E:
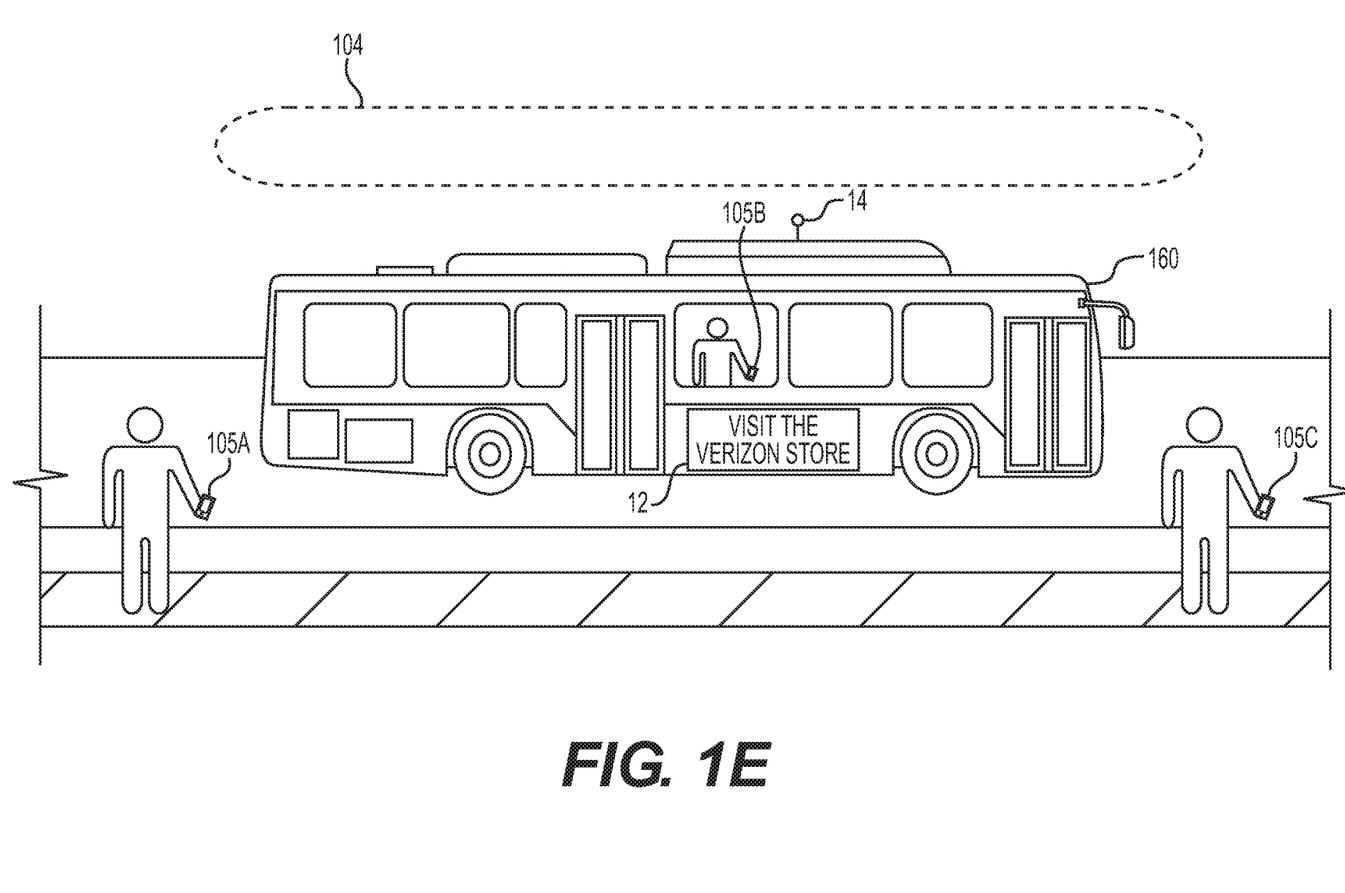
FIG. 1E is an illustration of a transit-oriented vehicle overlaid by a geofence or geographic zone, according to an exemplary embodiment of the present disclosure.

FIG. 1E is an illustration of a scenario, according to an embodiment of the present disclosure, in which a content provider transmits electronic content to a digital display 12 targeting potential consumers on-the-go. Display 12 may be associated with a transit-oriented vehicle that defines a geographical zone (or geofence) to monitor the relative position and/or movement of nearby electronic devices. The geofence may capture presence data (e.g., position and time detected within geofence) and absence data (e.g., position and time no longer detected within geofence) of electronic devices as the transit-oriented vehicle (and the respective geofence) moves along a predetermined path (or transit route). The transit-oriented vehicle may be connected to antenna 14 to enable wireless communication to display 12 and/or to communication networks associated with the content providers. In this example, display 12 may be located on a transit bus 160 to which potential consumers may regularly be exposed while traveling. Display 12 may be positioned inside and/or outside transit bus 160 to maximize exposure to potential consumers nearby. In some embodiments, display 12 may be placed on the exterior of transit bus 160 to gain exposure to potential consumers that are in view of transit bus 160 from the outside. In other embodiments, display 12 may be placed on the inside of transit bus 160 to gain exposure to potential consumers onboard the transit bus. Content providers may then tailor the electronic content transmitted to display 12 based on the likely exposure to potential consumers who are either onboard or outside transit bus 160. For example, a potential consumer with electronic device 105C may be identified as being present (e.g., as detected by geofence 104), or as likely to be present (e.g., based on the anticipated travel pattern of a user, as will be further discussed below with reference to FIG. 2), at an upcoming location as transit bus 160 travels along its predetermined route. Content providers may then prioritize the delivery of electronic content to display 12 based on the presence, or likely presence, of potential consumers with electronic devices 105C and within an anticipated field-of-view. A potential consumer with electronic device 105A may be identified as a user who may no longer be present (or otherwise "absent") within geofence 104 as transit bus 160 travels along its predetermined route. Content providers may then lower the priority of electronic content that may have otherwise been targeted to those potential consumers who may now be beyond the field-of-view. A potential consumer with electronic device 105b may be identified as a user who remains present within geofence 104 as transit bus 160 travels along its predetermined route. Content providers may then prioritize electronic content delivered to the internal dynamic display based on the internal field-of-view of potential consumers while onboard the transit bus. While the transit-oriented vehicle is discussed as a transit bus in this example, it is to be appreciated that other forms of transit-oriented vehicles are contemplated (e.g., subway lines, trains, ferry boats, taxis, ride-sharing vehicles, shuttle vans, etc.).

While FIGS. 1B, 1C, and 1E depict the geofences 104, 106 as being substantially circular, it should be appreciated that each may have any shape, such as a square, a rectangle, polygon, an irregular shape, etc., whether defined by one or more parameters, by a content provider or advertiser, by geographical boundaries, and/or by any other inputs.

As will be discussed in detail below, geofences 104, 106 may be generated according to parameters provided by one or more advertisers or electronic content providers and used to target users with relevant electronic content at the dynamic displays. In one embodiment, the geofence may be generated according to instructions received from an owner, operator, or other affiliate of a target location (e.g., Whole Foods, Safeway, Verizon stores, etc.). Alternatively or additionally, geofences 104, 106 may be generated according to parameters defined by an advertising network, mapping service, and/or geofencing service provider. Geofences 104, 106 may include any area, including one or more portions of various routes on the electronic map 100, such as highways having one or more exits and exit ramps, roads, such as local roads, intersections, or any other navigational or geographic points of interest.

Figure 2:
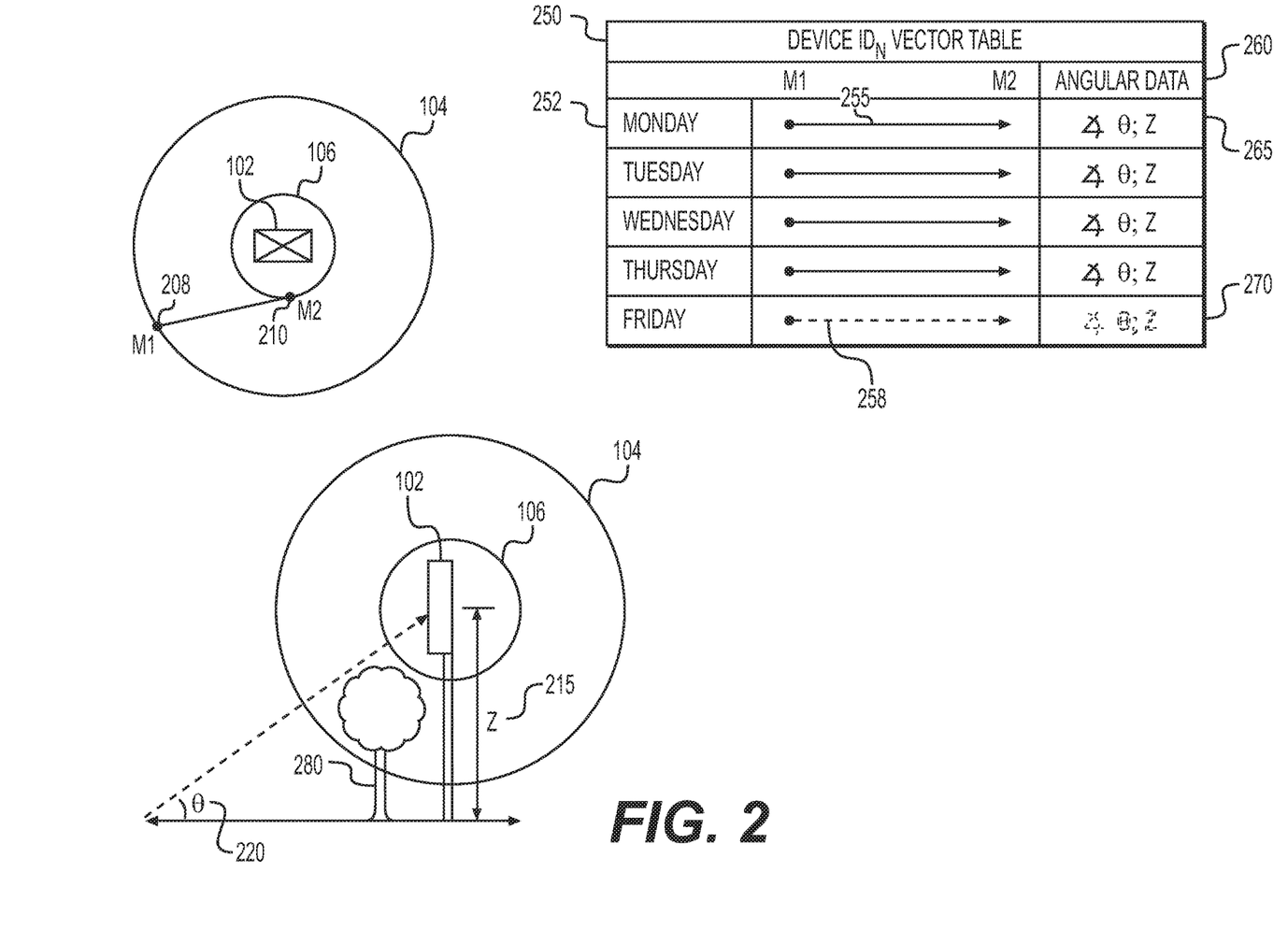
FIG. 2 is an illustration of a methodology for generating directional vectors for quantifying the displacement of electronic devices between a plurality of geofences or geographic zones, according to an exemplary embodiment of the present disclosure.

Of course, it should be appreciated from the description of FIGS. 1B-2 that any of the inner boundaries and outer boundaries may be of any type, configuration, and/or shape. For example, both the inner and outer boundaries may be defined by radii or other lengths or shapes relative to fixed location 102. Alternatively, both the inner and outer boundaries may be defined by travel times and/or distances relative to fixed location 102. Alternatively, the inner boundary may be defined by a radius or distance from fixed location 102, whereas the outer boundary may be defined by a travel time and/or distance relative to fixed location 102. Alternatively, the inner boundary may be defined by a travel time and/or distance relative to fixed location 102, whereas the outer boundary may be defined by a radius or distance from fixed location 102. Alternatively, both the inner and outer boundaries may be defined by travel times and/or distances relative to a transit-oriented vehicle. Alternatively, the inner boundary may be defined by a radius or distance from a transit-oriented vehicle, whereas the outer boundary may be defined by a travel time and/or distance relative to the transit-oriented vehicle. Alternatively, the inner boundary may be defined by a travel time and/or distance relative to the transit-oriented vehicle, whereas the outer boundary may be defined by a radius or distance from the transit-oriented vehicle.

Turning to FIG. 2, there is illustrated a method for determining position data, or travel vectors, for electronic devices as they travel between geofences 104, 106, according to an embodiment of the present disclosure. The presence of an electronic device may, for example, be detected at/or within geofence 104 at location M1. The position data 208 of location M1 may then be stored in an electronic device vector table 250. In some embodiments, the position data 208 may include geo-coordinate data, speed data, time data, angular data etc. Angular data 260 may include a viewing angle 220 and/or height information 215 of a display 12 (associated with either a fixed location 102 and/or a transit-oriented vehicle, as discussed above with reference to FIG. 1E) relative to horizontal plane of the electronic device. The angular data may provide information for determining an optimized height for positioning a display 12 over an obstacle 280 that may otherwise block a view of the display 12. The presence of the electronic device is subsequently detected at/or within geofence 106 at location M2. The position data 210 of location M2 may then be similarly stored in the electronic device vector table 250. A directional vector 255 may then be generated for the movement of the electronic device by extrapolation based on the position data 208, 210 from locations M1 and M2.

The quantifying and storing of the position data 208, 210, and the generated directional vectors 255 may be repeated for groupings or clusters of electronic devices as they travel through either one or both of geofences 104, 106. The clusters of electronic devices may be quantified and relayed over a sample period 252 to identify a position and/or movement pattern for the electronic devices. Identifying a position and/or movement pattern may provide information for predicting an anticipated directional vector 258 (and/or anticipated angular data 270) for similarly situated electronic devices. Content providers may then tailor electronic content targeting potential consumers with electronic devices based on their identifiable travel patterns and/or their predicted travel patterns.

Content providers may also leverage the identifiable travel patterns and/or predicted travel patterns to forecast users exposed to the electronic content (e.g., DOOH inventory) and/or to any one display. Because the measured travel patterns include both position information (e.g., position of users relative to digital displays) and temporal information (e.g., time of users at position relative to digital displays), content providers may forecast and tailor electronic content according to partitioned time segments (e.g., daypart or dayparting). In other embodiments, content providers may assign unique identifiers to users exposed to DOOH inventory. Content providers may then correlate the assigned unique identifiers to user behaviors observed online and/or offline. Similarly, content providers may leverage the measured travel patterns to dynamically optimize electronic content delivered to digital displays. The electronic content may be dynamically tailored and/or optimized based on, e.g., audience composition, in-store check-in volumes in response to DOOH inventory, dayparting, user trends, weather, macroeconomic signals, environmental signals, etc.

In other embodiments, content providers may leverage the identifiable travel patterns and/or predicted travel patterns to optimize planning for DOOH inventory. For example, content providers may optimize the purchase of sign faces (e.g., digital displays) according to, e.g., the availability of digital displays, campaign goals (e.g., pacing, frequency caps, spend, reach), targeting criteria, etc. Content providers therefore may make informed planning decisions to determine an optimal combination of targeted electronic content delivered to any one specific display.

Content providers may also leverage the identifiable travel patterns and/or predicted travel patterns to make better-informed decisions during real-time bidding (e.g., RTB auctions) on DOOH inventory. For example, content providers may submit bids in auctions (e.g., Vickrey-Clarke-Groves auctions) based on the availability of other DOOH inventory, pricing information, and known user exposure. In other embodiments, providers of digital displays may leverage measured travel patterns to dynamically price digital out-of-home media based on known user exposure.

Content providers may also leverage the measured travel patterns as a post-metric after delivering electronic content to any one display. For example, once an advertisement (e.g., electronic content) has completed its run (e.g., proof of play) on any one display, information related to the electronic content may be transmitted (e.g., wirelessly or by wireline) to a database where it may be combined with exposure counts to report on exposed audience counts. In other embodiments, content providers may leverage the measured travel patterns (and related exposure counts) to use as real-time audience detection around any one display.

In general, a geographic location of a user is based on detecting the geographic location of an electronic device (e.g., mobile telephone, a cellular telephone, or another device) associated with the user. A cellular system includes geographic location information that includes information on the geographic locations of the electronic devices. This may be accomplished, for example, by storing in a data table, list, or another type of data collection an association between a unique identifier for each of the electronic devices and the geographic location. A unique identifier for electronic devices, for example, may be the telephone number of a mobile telephone, a mobile electronic identity number (MEIN), a mobile identification number (MIN), a proprietary unique identifier (such as an account identifier), or another type of identifier that uniquely identifies a mobile telephone or a mobile telephone subscriber.

The cellular system also is capable of detecting, or receiving indications of, the geographic locations of the electronic devices and storing their geographic locations. In one example, the geographic location of an electronic device is received from the electronic device itself. Additionally or alternatively, the cellular system may detect the geographic location of each of the electronic devices. For example, in one implementation, the cellular system uses triangulation based on perceived distance of the electronic devices from multiple elements of the cellular system (e.g., transmission towers) to determine the geographic locations of the electronic devices. The perceived distance of the electronic devices is calculated from the time needed for signals from the electronic devices to reach the cellular system. In any case, the cellular system stores the geographic locations of the electronic devices.

Figure 3:
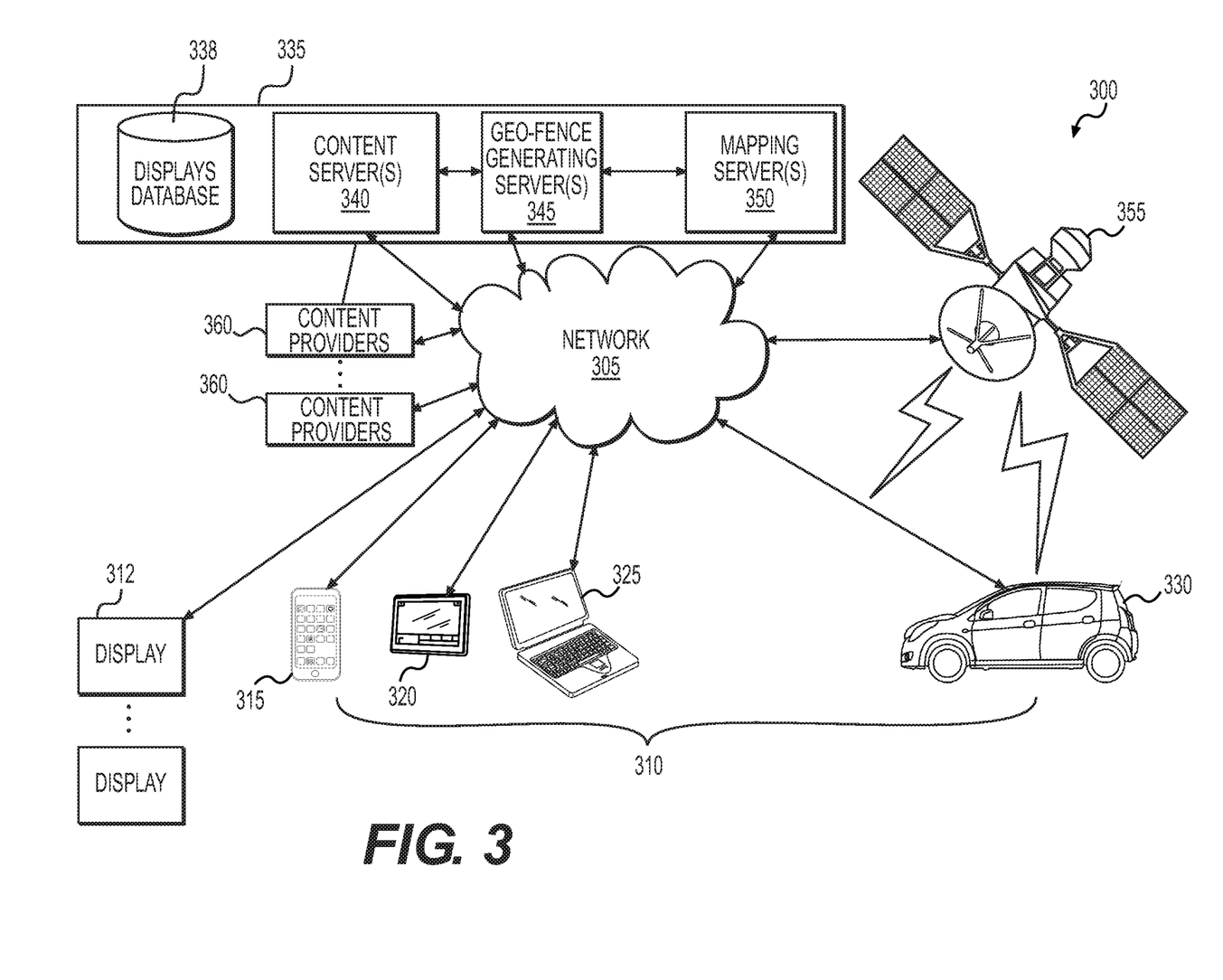
FIG. 3 is a block diagram of a communications environment and systems configured to generate and display electronic content based on individuals detected by one or more of a plurality of geofences or geographic zones, according to an exemplary embodiment of the present disclosure.

FIG. 3 is an illustration of an exemplary environment 300 in which content may be presented to a user's mobile electronic device 310 having GPS and/or a mapping software application. The mobile electronic device 310 may be any device connected to, or capable of connecting to a network 305, such as the Internet. Examples of such mobile electronic devices 310 may include mobile phones 315, in-car or portable GPS devices 320 and 330, computers 325 (e.g., laptops and tablets), smart watches, etc. The mobile electronic devices 310 may send and receive information via the network 305 and/or one or more satellites 355. The mobile electronic devices 310 also may communicate with a system of servers 335 via the network 305. The system of servers 335 may include one or more servers, such as content server(s) 340, geofence generating server(s) 345, and/or mapping server(s) 350 in communication with each other. In addition, the system may include one or more content providers 360 in communication with the server system 335. Examples of content providers may include advertisers, news agencies, government agencies, publishers, etc.

The content server 340 may be in communication with a displays database 338, which may include parameters received from one or more content providers 360 for sending content to displays 312. Such parameters may include parameters related to the geofence, demographic characteristics of users, and/or any other suitable parameters, or combination of parameters. Examples of parameters related to the geofence may include a travel distance and/or time from the target location, travel direction, travel speed, type of route (e.g., highway, tollway, road, local road, etc.). Examples of parameters related to the demographic information of a user may include vehicle type, average speed of the user, past online search history, driving habits, etc. Examples of other content parameters the content server 340 may receive from one or more content providers 360 may include weather conditions, date, day, time, etc., any of which may be used to control whether and how to transmit electronic content and/or advertising to user devices identified within one or more geofences. Of course, it should be appreciated that any type of business or entity might target geofences to any combination of roads or intersections or locations, at any desired day or time, to target any desired segment of the population, with any relevant electronic content and/or ads. The parameters received by the content server 340 may be processed by the content provider 360 and saved in a database, which may be accessed by the one or more geofence generating servers 345.

The geofence generating server(s) 345 may generate one or more virtual electronic geofences based on the parameters received by the content server 340 and may retrieve relevant mapping information from the mapping server 350 in order to accurately generate the geofence in accordance with the parameters received from the content provider 360. According to various embodiments, the geofence generating server(s) 345 may generate, maintain, and implement any number of geofences, simultaneously, for any number of roads and/or intersections, businesses, promotions, etc. Each geofence maintained by the geofence generating server(s) 345 may have any desired shape, such as the shapes depicted in FIGS. 1B-2, the shape of an annular donut (e.g., a "geodonut"), the shape of portions of one or more road or highway lanes, the shape of an intersection, the shape of a plurality of road/intersection portions, the shape of a transit-oriented vehicle, a polygon (or plurality thereof), a rectangle (or plurality thereof), etc. In one embodiment, the geofence generating server(s) 345 may generate the one or more geofences based on inputs received from content server(s) 340, mapping server(s) 350, content provider(s) 360, or any other publishers, advertisers, etc. The geofence generating server(s) 345 may, in combination with the mapping server(s) 350, monitor the location of one more users' devices relative to perimeter/area information associated with each geofence (e.g., relative to either one or both of the inner and outer boundaries) to generate and maintain an updated list of the devices that enter and remain within each geofence (e.g., that may be within the outer boundary but not within the inner boundary).

The mapping server 350 may store and process information regarding road geometry, road intersections, routing graphs, traffic patterns, road closures, event information, average traffic speed, etc. In addition, the system may be in communication with the electronic devices 310 via the network 305 and/or satellite(s) 355 to receive location, travel, and any other user information that may be used to generate geofences and identify devices within each geofence in accordance with the content parameters. For illustrative purposes only, the server system 335 is shown in FIG. 3 to include servers 340, 345, and 350 in a unitary structure, however, it should be understood that any or all of the servers 340, 345, and 350 may be external to each other and owned and/or operated by different entities, as long as electronic communication may occur within one or more of the servers 340, 345, and 350. Any of servers 340, 345, and 350 may operate in conjunction with each other, and/or perform the functions of each other.

Figure 4:
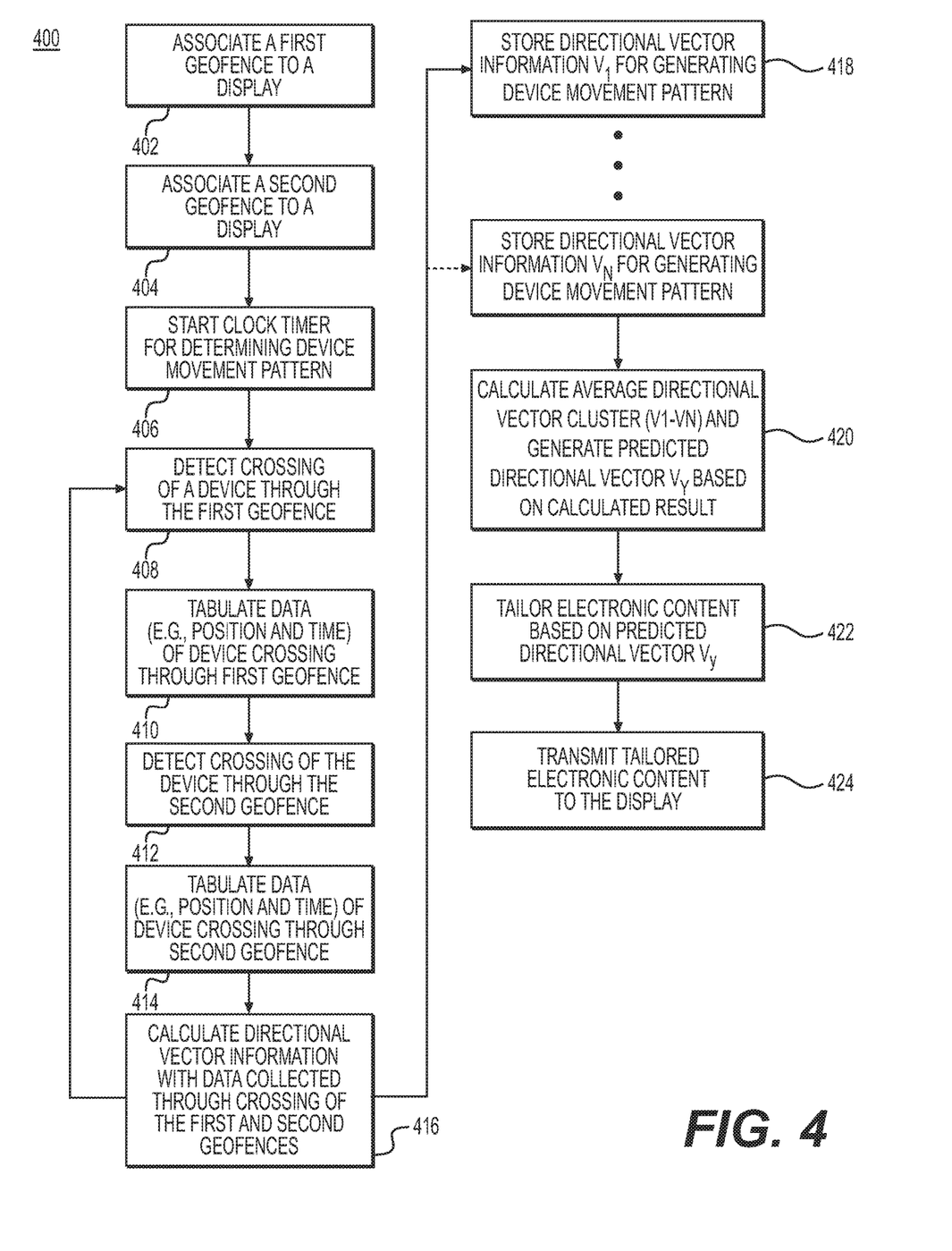
FIG. 4 is a flow diagram of methods for presenting electronic content to individuals based on the displacement of electronic devices detected by one or more geofences or geographic zones, according to exemplary embodiments of the present disclosure.

FIG. 4 is a flow diagram of a method 400 for transmitting electronic content to displays based on anticipated travel patterns of potential consumers traveling between predefined geofences, according to an embodiment of present disclosure. The method 400 may include a step 402 of associating a first geofence to a display for providing first-position information of an electronic device relative to a display. In some embodiments, the first geofence is defined relative to the position of the display. In other embodiments, the first geofence is defined relative to the position of a fixed location associated with the display. In step 404, a second geofence is associated with the display for providing second-position information of the electronic device relative to the display. In some embodiments, the second geofence is defined relative to the position of the display. In other embodiments, the second geofence is defined relative to the position of a fixed location associated with the display. In step 406, a clock timer may be started to provide temporal information (e.g., time stamp, speed, etc.) for electronic devices identified at/or within the first and second geofences. At step 408, the presence of an electronic device associated with a potential consumer is detected at/or within the first geofence. At step 410, the first-position information and temporal information of the first geofence detection is stored in a database. At step 412, the presence of the same electronic device is detected at/or within the second geofence. At step 414, the second-position information and temporal information of the second geofence detection is stored in a database.

At step 416 of method 400, a directional vector is generated based on the first-position information and the second-position information. Steps 408 through 416 are repeated to generate directional vectors for other electronic devices traveling between the first geofence and the second geofence. In step 418, the respective directional vectors generated for each of the detected electronic devices traveling between the first geofence and the second geofence are stored in a database. In step 420, an anticipated directional vector is generated based on an extrapolation of the directional vectors generated in step 416. In some embodiments, the anticipated directional vector is based on an average of the directional vectors stored in step 418. In step 422, content providers may tailor the electronic content transmitted to dynamic displays based on the anticipated directional vectors of potential consumers and their electronic devices. In step 424, the tailored electronic content is transmitted to the displays.

Figure 5:
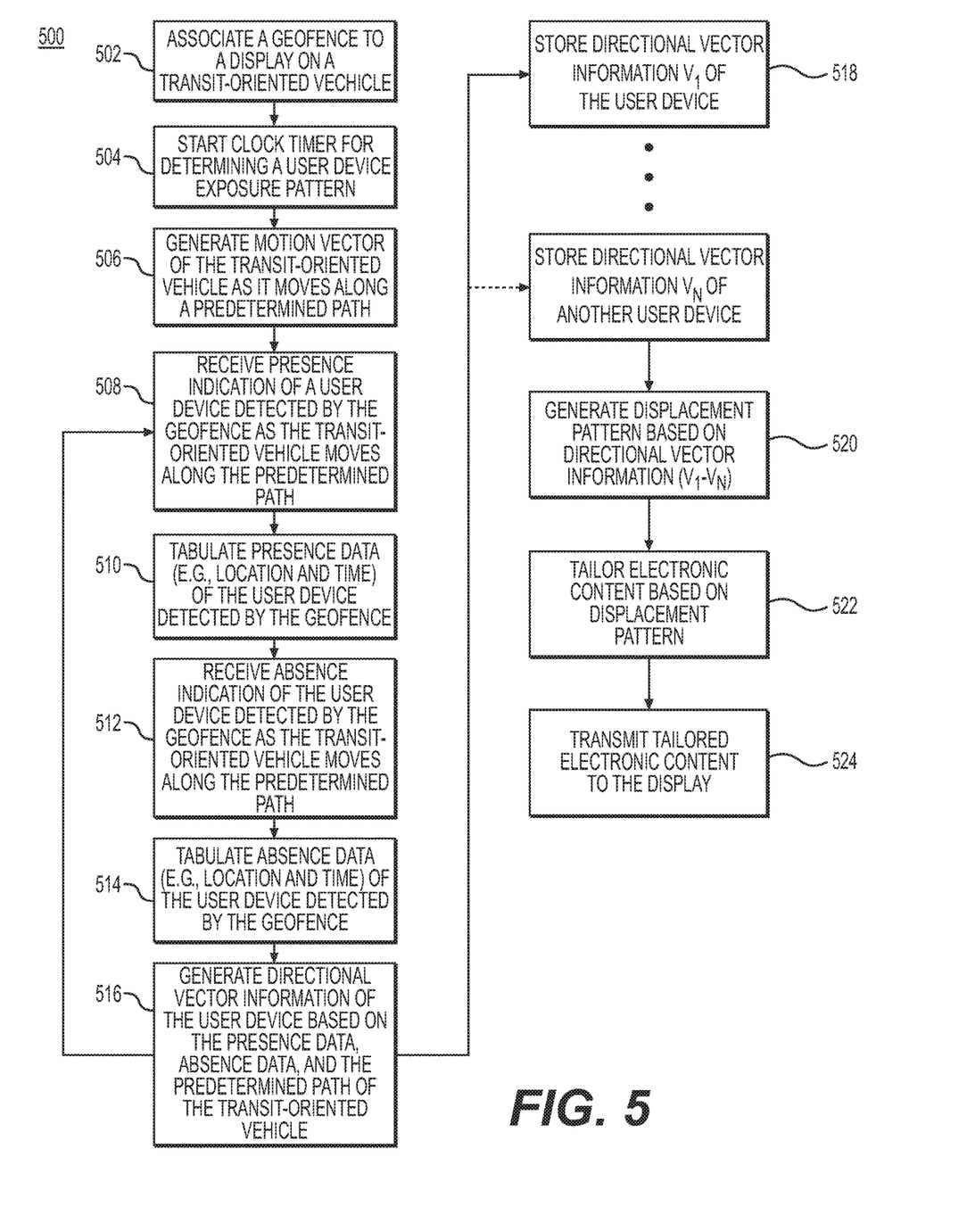
FIG. 5 is a flow diagram of methods for presenting electronic content to individuals based on the displacement of electronic devices detected by one or more geofences or geographic zones, according to exemplary embodiments of the present disclosure.

FIG. 5 is a flow diagram of a method 500 for transmitting electronic content to displays based on anticipated travel patterns of potential consumers within the field-of-view of a transit-oriented vehicle, according to an embodiment of present disclosure. The method 500 may include a step 502 of associating a geofence to a display for providing position information and temporal information of an electronic device relative to the display. In some embodiments, the geofence may be defined relative to the position of the display. In other embodiments, the geofence may be defined relative to the position of the transit-oriented vehicle associated with the display. In step 504, a clock timer may be started to provide temporal information (e.g., time stamp, speed, etc.) for electronic devices identified at/or within the geofence. At step 506, a motion vector is mapped based on a predetermined path (or transit route) of the transit-oriented vehicle. At step 508, presence information (position and temporal) is received indicating that an electronic device associated with a potential consumer is detected at/or within the geofence as the transit-oriented vehicle travels along the predetermined path (or transit route). At step 510, the presence information (position and temporal) is stored in a database. At step 512, absence information is received indicating that the same electronic device is no longer detected at/or within the geofence as the transit-oriented vehicle travels along the predetermined path (or transit route). At step 514, the absence information is stored in the database.

At step 516 of method 500, a directional vector is generated based on the presence information, the absence information, and the predetermined path (or transit route) of the transit-oriented vehicle. Steps 508 through 516 are repeated to generate directional vectors for other electronic devices detected by the geofence as it moves along the predetermined path (or transit route). In step 518, the respective directional vectors generated for each of the detected electronic devices are stored in a database. In step 520, a displacement pattern is generated based on an extrapolation of the directional vectors generated in step 516. In some embodiments, the displacement pattern is based on an average of the directional vectors stored in step 518. In step 522, content providers may then tailor the electronic content transmitted to displays based on the displacement pattern of potential consumers and their electronic devices. In step 524, the tailored electronic content may be transmitted to the displays.

Figure 6:
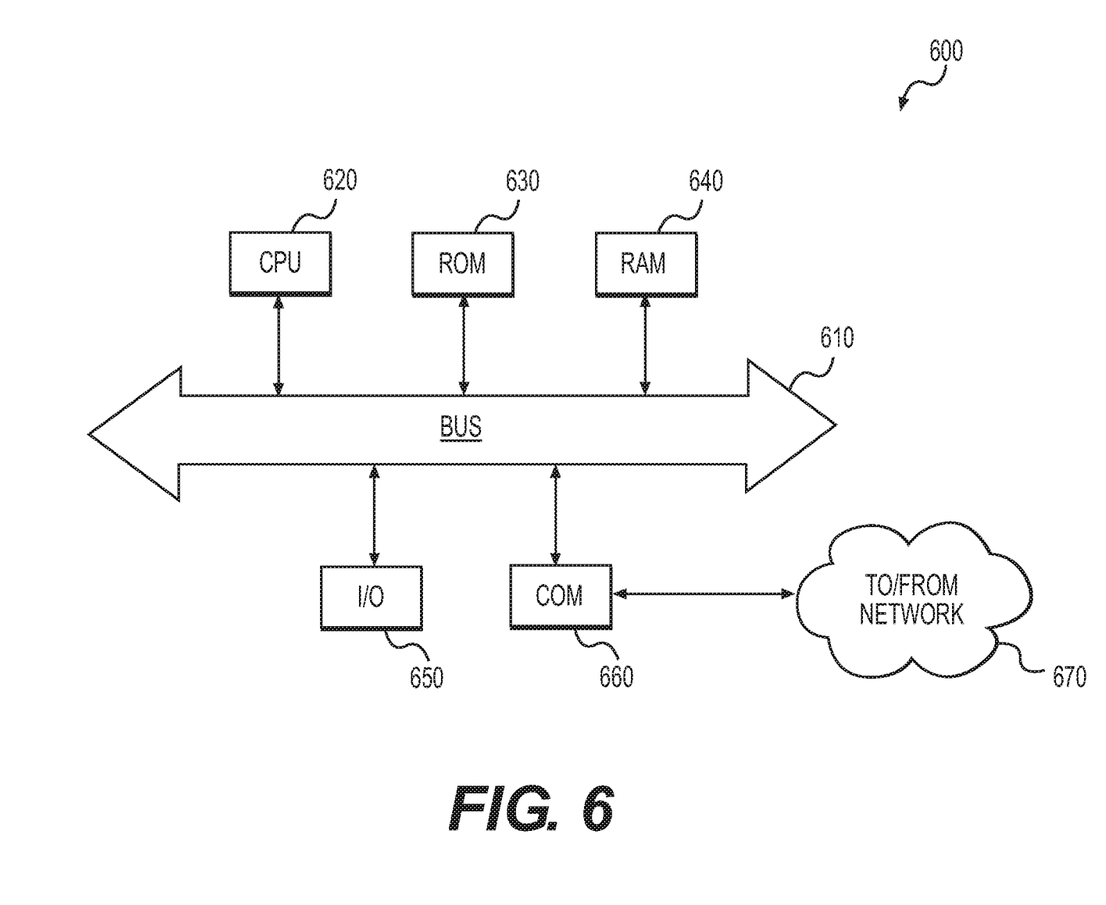
FIG. 6 is a simplified functional block diagram of a computer configured as a content, geofence generating, and/or mapping server, for example, for presenting electronic content to individuals with electronic devices detected by one or more geofences or geographic zones, according to exemplary embodiments of the present disclosure.

FIG. 6 provides a functional block diagram illustration of computer hardware platforms consistent with any of the devices and servers described herein. FIG. 6 illustrates a network or host computer platform 600, as may typically be used to implement a server. It is believed that those skilled in the art are familiar with the structure, programming, and general operation of such computer equipment and as a result, the drawings should be self-explanatory.

A platform for a server or the like 600, for example, may include a data communication interface for packet data communication 660. The platform may also include a central processing unit (CPU) 620, in the form of one or more processors, for executing program instructions. The platform typically includes an internal communication bus 610, program storage, and data storage for various data files to be processed and/or communicated by the platform such as ROM 630 and RAM 640, although the server 600 often receives programming and data via network communications 670. The hardware elements, operating systems, and programming languages of such equipment are conventional in nature, and it is presumed that those skilled in the art are adequately familiar therewith. The server 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the electronic device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for transmitting electronic content to a dynamic display, the method comprising:
   receiving, by a processor of a content server, a request from a content provider to transmit electronic content to a dynamic display of a transit-oriented vehicle, the electronic content relating to a target location affiliated with the content provider, the dynamic display in proximate view to one or more users within a predefined distance to the transit-oriented vehicle, a geographic location of the one or more users based on a detected location of an electronic device of the one or more users, the electronic device of the one or more users including a unique identifier to uniquely identify each of the one or more users, the request including one or more content parameters for controlling whether and how to transmit the electronic content to the dynamic display of the transit-oriented vehicle;
   generating, by the processor of the server, a first shape of a geofence centered about and extending a boundary around the transit-oriented vehicle, the geofence generated based on the one or more content parameters received in the request, the first shape of the geofence configured to track and move with the transit-oriented vehicle along a predetermined transit route;
   detecting, by the processor of the server, a first electronic device of a first user within the boundary of the geofence based on signals emitted by the first electronic device, the signals including a respective unique identifier associated with the first user;
   detecting, by the processor of the server, at least one of presence information and absence information of the first electronic device of the first user based at least on the signals emitted by the first electronic device, the at least one of the presence information and the absence information based on position of the first user relative to the dynamic display and a time of the first user at the position as the transit-oriented vehicle moves along the predetermined path;
   determining, by the processor of the server, based on the at least one of the presence information and the absence information, whether the first user is within an anticipated field-of-view as the transit-oriented vehicle moves along the predetermined path;
   tailoring, by the processor of the server, the electronic content based on i) the determination, ii) the one or more content parameters received in the request, and iii) the at least one of the presence information and the absence information of the detected first electronic device; and
   transmitting, by the processor of the server, the tailored electronic content to the dynamic display of the transit-oriented vehicle.

2. The method of claim 1, wherein the geofence is positioned within an immediate zone relative to the transit-oriented vehicle.

3. The method of claim 2, wherein the geofence is circular.

4. The method of claim 3, wherein the geofence is defined by a radius around the transit-oriented vehicle.

5. The method of claim 2, wherein the geofence is a polygon.

6. The method of claim 1, wherein the presence information includes position information and temporal information.

7. The method of claim 6, wherein the position information comprises geo-coordinates identifying the location of the one or more electronic devices relative to the transit-oriented vehicle.

8. The method of claim 1, wherein the absence information includes position information and temporal information.

9. The method of claim 8, wherein the position information comprises geo-coordinates identifying the location of the one or more electronic devices relative to the transit-oriented vehicle.

10. A system for managing the transmission of electronic content to a dynamic display, the system comprising:
    a data storage device storing instructions for managing the transmission of electronic content to a dynamic display of a transit-oriented vehicle; and
    a processor configured to execute the instructions to perform a method comprising:
    receiving, by a processor of a content server, a request from a content provider to transmit electronic content to the dynamic display of the transit-oriented vehicle, the electronic content relating to a target location affiliated with the content provider, the dynamic display in proximate view to one or more users within a predefined distance to the transit-oriented vehicle, a geographic location of the one or more users based on a detected location of an electronic device of the one or more users, the electronic device of the one or more users including a unique identifier to uniquely identify each of the one or more users, the request including one or more content parameters for controlling whether and how to transmit the electronic content to the dynamic display of the transit-oriented vehicle;
    generating, by the processor of the server, a first shape of a geofence centered about and extending a boundary around the transit-oriented vehicle, the geofence generated based on the one or more content parameters received in the request, the first shape of the geofence configured to track and move with the transit-oriented vehicle along a predetermined transit route;
    detecting, by the processor of the server, a first electronic device of a first user within the boundary of the geofence based on signals emitted by the first electronic device, the signals including a respective unique identifier associated with the first user;
    detecting, by the processor of the server, at least one of presence information and absence information of the first electronic device of the first user based at least on the signals emitted by the first electronic device, the at least one of the presence information and the absence information based on a position of the first user relative to the dynamic display and a time of the first user at the position as the transit-oriented vehicle moves along the predetermined path;

determining, by the processor of the server, based on the at least one of the presence information and the absence information, whether the first user is within an anticipated field-of-view as the transit-oriented vehicle moves along the predetermined path;

tailoring, by the processor of the server, the electronic content based on i) the determination, ii) the one or more content parameters received in the request, and iii) the at least one of the presence information and the absence information of the detected first electronic device; and transmitting, by the processor of the server, the tailored electronic content to the dynamic display of the transit-oriented vehicle.

11. The system of claim 10, wherein the geofence is positioned within an immediate zone relative to the transit-oriented vehicle.

12. The system of claim 11, wherein the geofence is circular.

13. The system of claim 12, wherein the geofence is defined by a radius around the transit-oriented vehicle.

14. The system of claim 11, wherein the geofence is a polygon.

15. The system of claim 10, wherein the presence information includes position information and temporal information.

16. The system of claim 15, wherein the position information comprises geo-coordinates identifying the location of the one or more electronic devices relative to the transit-oriented vehicle.

17. The system of claim 10, wherein the absence information includes position information and temporal information.

18. The system of claim 17, wherein the position information comprises geo-coordinates identifying the location of the one or more electronic devices relative to the transit-oriented vehicle.

19. A non-transitory computer-readable medium that, when executed by a computer system, causes the computer system to perform a method for managing the transmission of electronic content to a dynamic display, the method including:

receiving, by a processor of a content server, a request from a content provider to transmit electronic content to a dynamic display of a transit-oriented vehicle, the electronic content relating to a target location affiliated with the content provider, the dynamic display in proximate view to one or more users within a predefined distance to the transit-oriented vehicle, a geographic location of the one or more users based on a detected location of an electronic device of the one or more users, the electronic device of the one or more users including a unique identifier to uniquely identify each of the one or more users, the request including one or more content parameters for controlling whether and how to transmit the electronic content to the dynamic display of the transit-oriented vehicle;

generating, by the processor of the server, a first shape of a geofence centered about and extending a boundary around the transit-oriented vehicle, the geofence generated based on the one or more content parameters received in the request, the first shape of the geofence configured to track and move with the transit-oriented vehicle along a predetermined transit route;

detecting, by the processor of the server, a first electronic device of a first user within the boundary of the geofence based on signals emitted by the first electronic device, the signals including a respective unique identifier associated with the first user;

detecting, by the processor of the server, at least one of presence information and absence information of the first electronic device of the first user based at least on the signals emitted by the first electronic device, the at least one of the presence information and the absence information based on position of the first user relative to the dynamic display and a time of the first user at the position as the transit-oriented vehicle moves along the predetermined path;

determining, by the processor of the server, based on the at least one of the presence information and the absence information, whether the first user is within an anticipated field-of-view as the transit-oriented vehicle moves along the predetermined path;

tailoring, by the processor of the server, the electronic content based on i) the determination, ii) the one or more content parameters received in the request, and iii) the at least one of the presence information and the absence information of the detected first electronic device; and transmitting, by the processor of the server, the tailored electronic content to the dynamic display of the transit-oriented vehicle.

20. The non-transitory computer-readable medium of claim 19, wherein the presence information includes position information and temporal information.

* * * * *